April 22, 1952        P. WILLIS        2,593,951
LOCOMOTIVE VALVE AND VALVE GEAR, INCLUDING SEPARATE
INTAKE AND EXHAUST VALVES AND SEPARATE ACTUATING
MECHANISMS THEREFOR IN A SINGLE VALVE CHEST
Filed Oct. 11, 1946        5 Sheets-Sheet 3
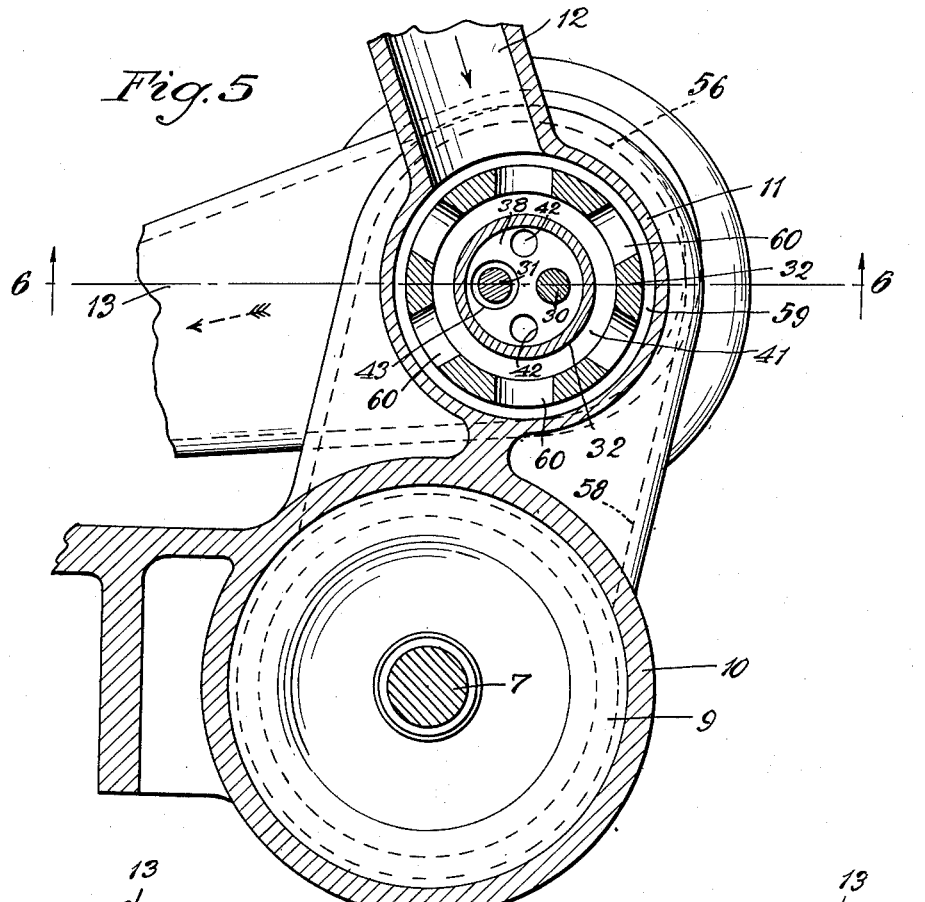
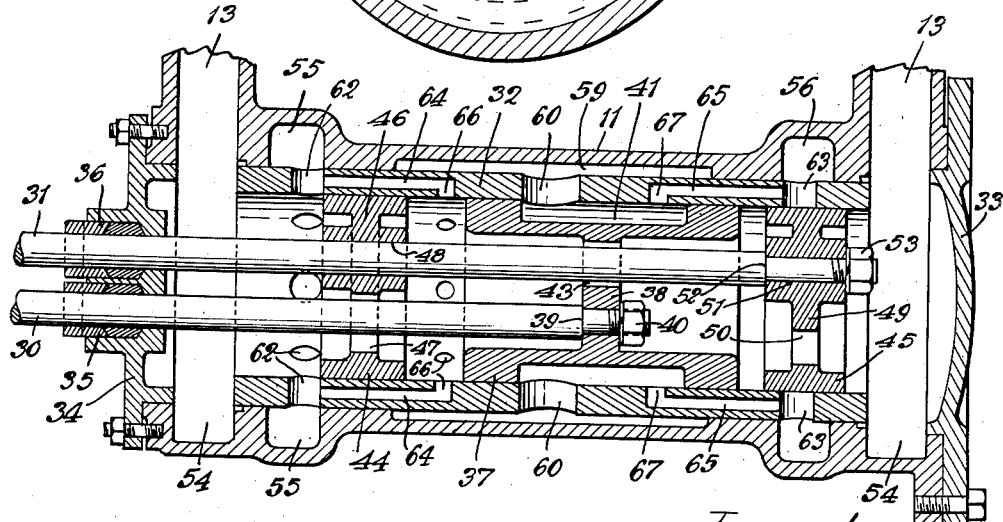
Inventor
Paul Willis
by Parker & Carter
Attorneys

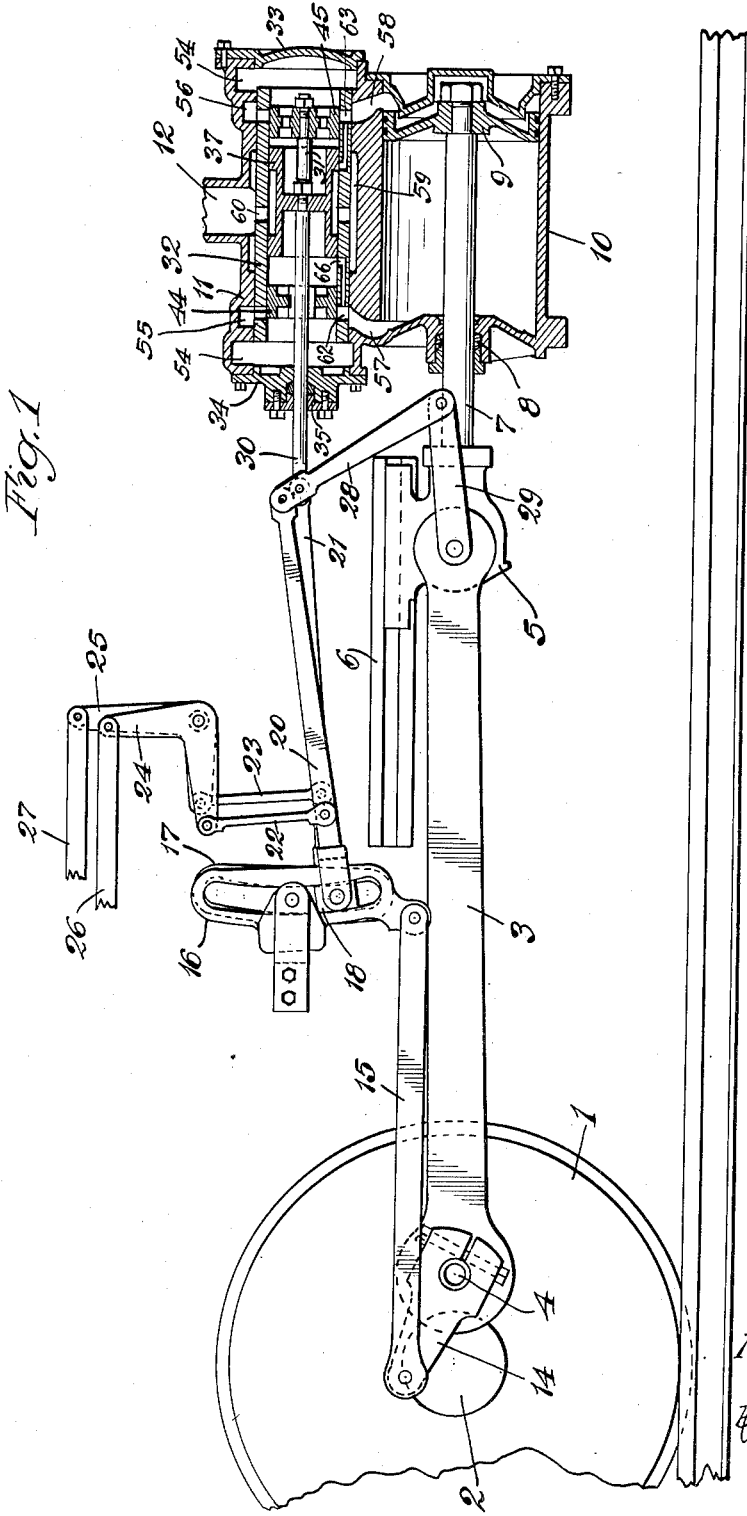

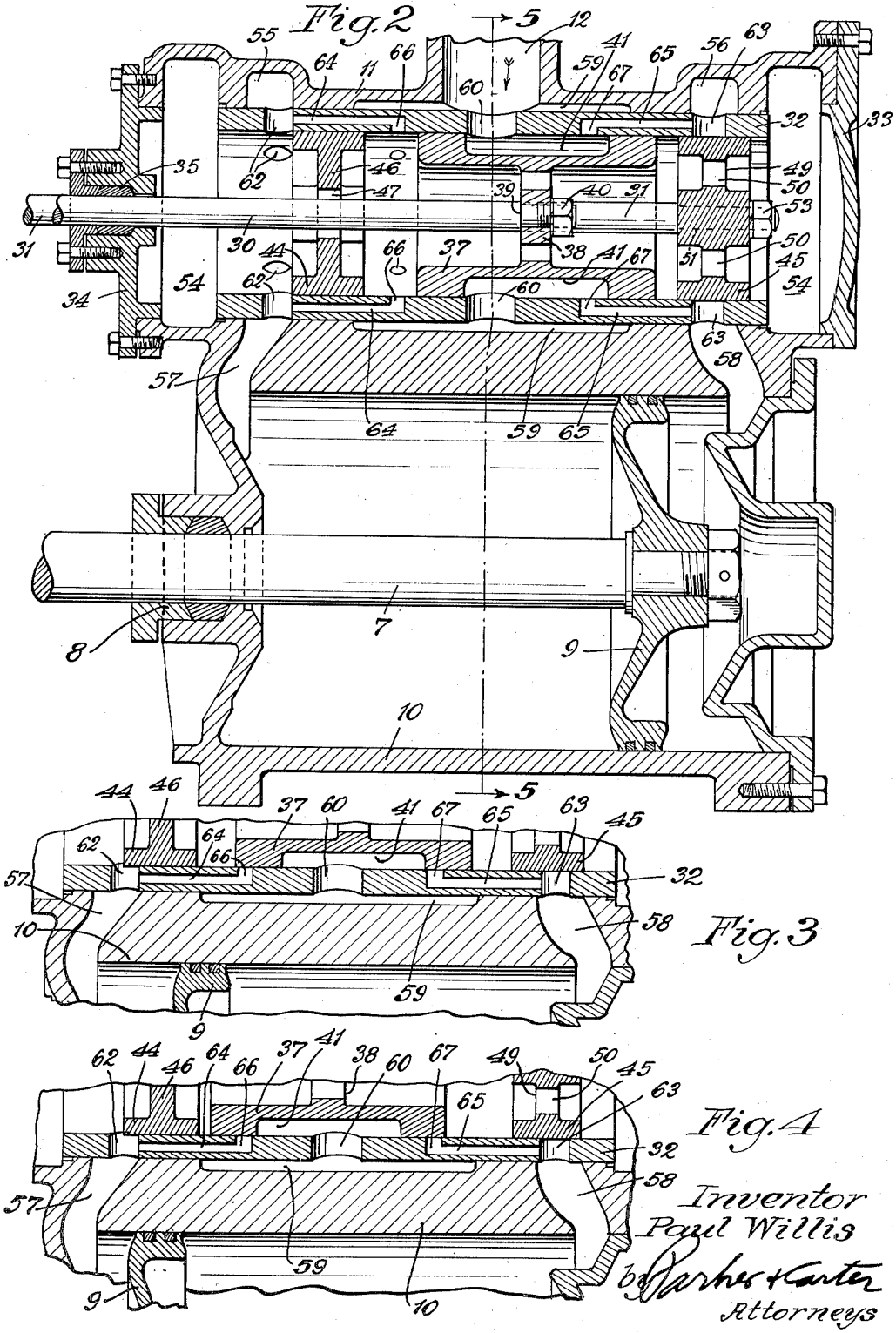

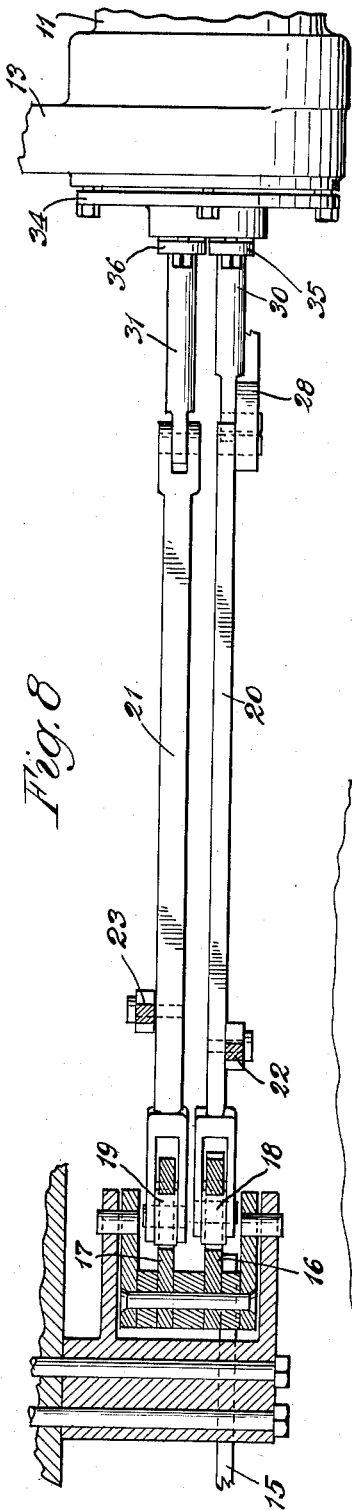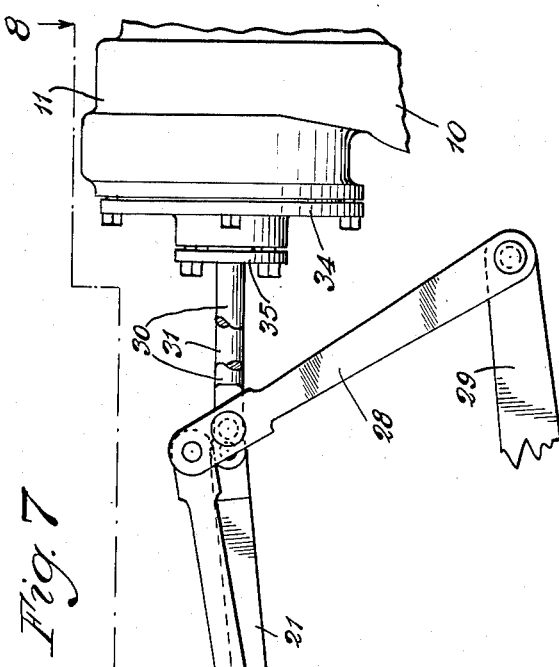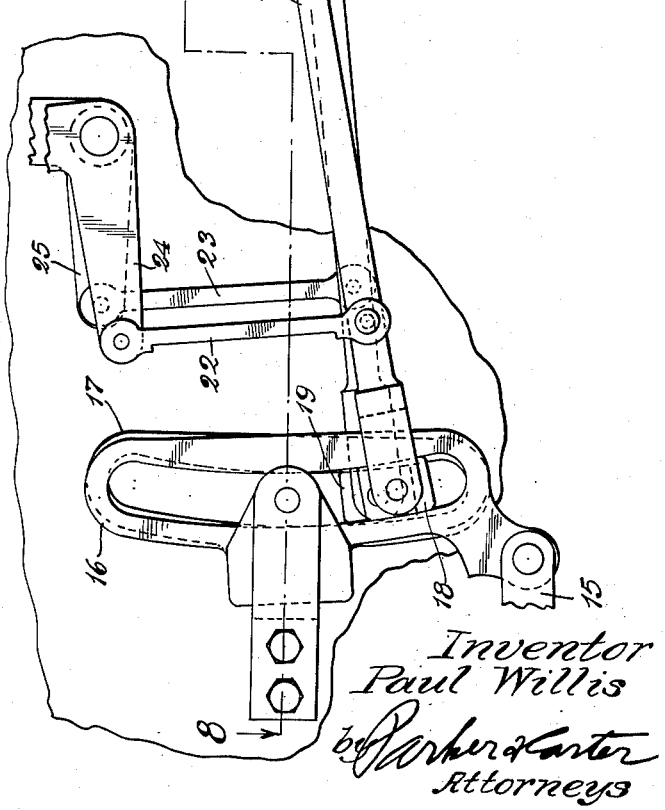

Inventor
Paul Willis
by Parker & Carter
Attorneys

Patented Apr. 22, 1952

2,593,951

UNITED STATES PATENT OFFICE 2,593,951

LOCOMOTIVE VALVE AND VALVE GEAR, INCLUDING SEPARATE INTAKE AND EXHAUST VALVES AND SEPARATE ACTUATING MECHANISMS THEREFOR IN A SINGLE VALVE CHEST

Paul Willis, Blue Island, Ill.

Application October 11, 1946, Serial No. 702,817

9 Claims. (Cl. 121—146)

My invention relates to improvements in locomotive engines and the like and has for one object to provide a new and improved type of valve, and a valve operating mechanism which can vary the point of cut off without substantial change in the point of exhaust. Other objects will appear from time to time in the course of the specification and claims.

I have illustrated my invention as applied to a Walschaert valve gear, though it might equally well be used with any other type of locomotive valve gears such as Baker, Young, Stevenson or any other usable with locomotive engines.

The conventional type of piston valve with Walschaert or other type of valve gear is well known, it may be controlled by the operator to change the point of cut off so that when the engine is starting under heavy load, cut off takes place late in the cycle and maximum boiler pressure is applied to the piston throughout the major part of its stroke. As the load is picked up, the gear will be manipulated by the operator to above the point of cut off so that most of the work is done by expansion of steam in the cylinder after boiler pressure has been cut off.

However, when a single piston controls admission, cut off, and exhaust, change in the point of cut off can only be accomplished by changing the relative position of the entire valve in the engine cycle, and the result is that change in point of cut off inevitably changes the exhaust timing.

The optimum is a situation where exhaust always comes at the same time and the exhaust valve is open during exactly the same part of the valve and engine cycle under all conditions. This cannot well be accomplished by a single valve and I propose therefore to use two valves, one an admission valve which will, under the control of the operator, be adjustable in its relation to the piston travel, the other an exhaust valve which will have no such adjustment and will always open and close at the same points in the cycle. In addition to this, I propose to use the admission valve to control a portion of the exhaust in consonance with the exhaust valve.

I propose to put both valves in the same valve chest and have them both travel in and be supported by the same valve chest bushing. Two valve stems will be used and each valve stem will be actuated by a radius link associated with a separate reversing link. The two reversing links will be driven in unison by the engine in the usual manner. The operating mechanism associated with these two reversing links will be such that they move simultaneously from forward to reverse and vice versa, the exhaust valve having but two positions, forward and reverse, the admission valve having an infinite number of positions, under control of the operator, from forward through neutral to reverse whereby the point of cut off may be controlled.

By using a simple valve chest bushing and by having the two valves reciprocate in coordination in that bushing, I am enabled to obtain a valve assembly which is lubricated in the same manner as the conventional type of valve and as a result no change in lubrication is needed, lubrication conditions remain as before and no lubrication difficulties are encountered even when superheated steam is used.

My invention is illustrated more or less diagrammatically in the accompanying drawings, wherein Figure 1 is a diagrammatic side elevation in part section;

Figure 2 is a section on an enlarged scale similar to the section in Figure 1;

Figure 3 is a part section of the valve, valve chamber, piston and cylinder at eighty percent cut off;

Figure 4 is a similar view at ninety percent cut off;

Figure 5 is a section along the line 5—5 of Figure 2;

Figure 6 is a section along the line 6—6 of Figure 5;

Figure 7 is an enlarged side elevation of the valve gear;

Figure 8 is a section along the line 8—8 of Figure 7;

Like parts are indicated by like characters throughout the specification and drawings.

Figure 9:
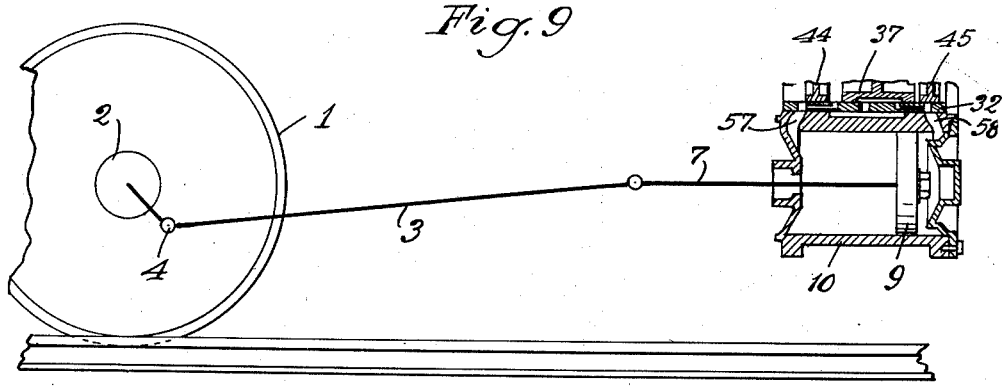
Figure 9 is a diagram showing the crank position corresponding to Figure 2.

1 is a locomotive drive wheel. 2 is the axle, 3 the connecting rod, 4 the crank pin, 5 the cross head, 6 the cross head guide, 7 the piston rod, 8 the piston rod packing gland, 9 the piston, 10 the cylinder, 11 the steam or valve chest, 12 the live steam passage, 13 the exhaust steam passages, 14 the eccentric crank, 15 the eccentric rod which simultaneously actuates the two reversing links, 16 for admission and 17 for exhaust. While these two links rotate about a common center, it will be noted that their radii are slightly different. 18 is the link block for admission, 19 the link block for exhaust. 20 is the radius rod for admission, 21 the radius rod for exhaust. 22 is the admission radius rod lifter, 23 the exhaust radius rod lifter. 24 is the admission reverse shaft lever, 25 the exhaust reverse shaft lever. 26 is the admission reach rod, 27 the exhaust reach rod, both leading to the reverse mechanism, not here illustrated, controlled by the operator. The admission radius rod is pivoted at its free end to the end of combination lever 28 which in turn is connected by the union link 29 to the engine cross head 5 and intermediate its ends is pivoted to the admission valve stem 30. The exhaust radius rod 21 is directly pivoted to the exhaust piston rod 31. 32 is the steam chest bushing, open at both ends, seated within the steam chest 11 and ported, as will hereinafter appear. 33 and 34 are steam chest heads. The steam chest head 34, at the crank end of the steam chest, contains two packing glands, 35 for the admission valve stem, 36 for the exhaust valve stem. The admission valve 37 reciprocates in the steam chest bushing, being operated by the admission valve stem 30. This valve is generally cylindrical, has a central web 38 through which the valve stem 30 passes, the valve stem being shouldered as at 39 to engage one side of the web and having a threaded bolt 40 engaging the other side of the web whereby there is a rigid connection between the valve stem and the piston. The piston is relieved intermediate its two ends so that it contacts the steam chest bushing only at the two ends and there is a steam passage 41 between those two ends. The web 38 is apertured at 42 to permit steam passage from one end of the admission valve to the other and apertured at 43 to permit free passage of the exhaust valve stem 31. The exhaust valve comprises two cylindrical members 44, 45, one on each side of the admission valve. The member 44 has a web 46 apertured at 47 to permit free passage of the admission valve stem 30 and to permit passage of steam through the web. It is also apertured at 48 to engage the exhaust valve stem and is firmly held on that valve stem by press fit, key, set screw or other suitable means. The cylindrical exhaust valve member 45 has a web 49 apertured at 50 to permit passage of steam therethrough, apertured at 51 to engage the exhaust valve stem 31 which is shouldered to engage one side of the web at 52. It is provided with a threaded nut 53 to engage the other side of the web. Thus the two cylindrical spools or members 44, 45 are held in fixed relation with one another as they reciprocate responsive to reciprocation of the exhaust valve stem 31. At each end of the steam chest is an exhaust chamber 54, each communicating with one of the exhaust steam passages 13. The outer diameter of the exhaust chambers 54 is substantially larger than the outer diameter of the steam chest bushing so that there is a free opening for exhaust from the steam chest. 55, 56 are annular steam passages in the wall of the steam chest encircling the steam chest bushing. They communicate by means of steam passages 57, 58 with the engine cylinder 10 on either side of the piston 9. 59 is a live steam passage bounded on the outside by the inner wall of the steam chest and on the inside by the outer face of the steam chest bushing. The steam chest bushing has a series of ports 60 therethrough whereby steam may pass from the live steam passage 12 to the steam passage 59, through the port 60 to the steam chamber 61 on the outer periphery of the admission valve, this chamber being bounded by the admission valve on the inside and the inner face of the bushing 32 on the outside. Ports 62, 63 are disposed in the wall of the steam chest bushing in register with the steam chambers 55 and 56 and steam passages 64 and 65 are disposed longitudinally of the steam chest bushing. These passages end at the ports longitudinally of the steam chest bushing. These passages end at the ports 62 and 63, respectively, and communicate at 66 and 67 with the inside of the steam chest bushing where they are controlled by the admission valve, as will hereinafter appear.

Figure 10:
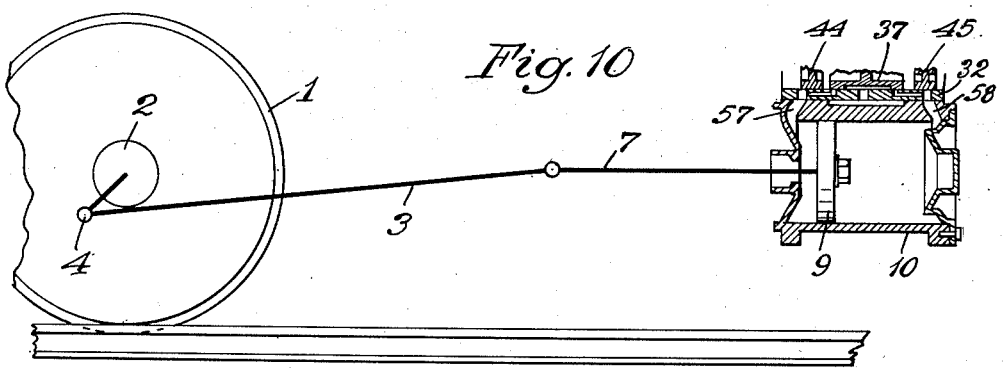
Figure 10 is a similar diagram showing the crank position corresponding to Figure 3.
Figure 11:
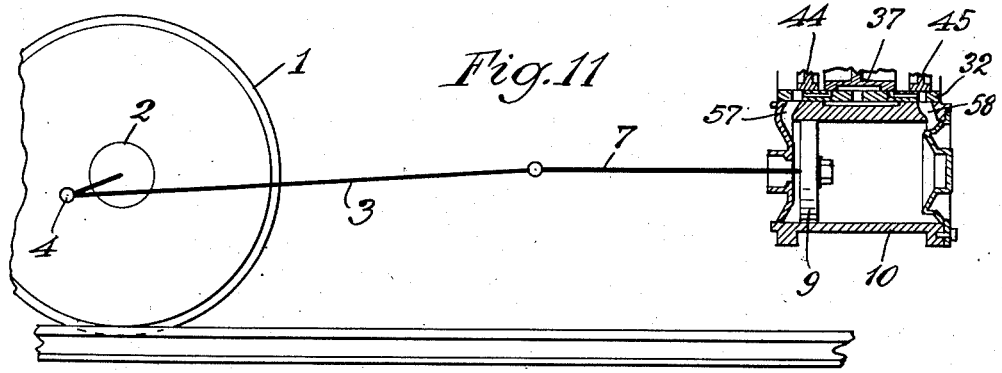
Figure 11 is a similar diagram showing the crank position corresponding to Figure 4.

The various positions of the valve piston and crank shaft may be well traced by consideration of Figure 1 which shows the piston at forward dead center. Figures 2 and 9 show piston and valve position after the crank has rotated in forward position approximately forty-five degrees. Figures 3 and 10 show piston and valve position after the crank has rotated approximately one hundred thirty-five degrees or eighty per cent cut off. Figures 4 and 11 show the crank position when the piston is just approaching rear end dead center or about ninety per cent cut off.

It will be understood that whereas I have described and illustrated an operative device, still many changes might be made in the size, shape, number and disposition of parts without departing materially from the spirit of my invention. I wish, therefore, that my showing be taken as in a sense diagrammatic and illustrative, rather than limiting me to my precise showing.

The use and operation of my invention are as follows:

Starting from the position shown in Figure 1, the piston 9 moves to the left. The admission valve 37 moves to the right to open port 67 (see Figure 2), steam enters from the live steam passage 12 through passage 59, port 60, chamber 61, port 67, passage 65, port 56, passage 58, into the engine cylinder on the right-hand or head end of the piston. The exhaust valve member 44 has moved to the right to open the port 62 and exhaust steam leaves the cylinder on the crank side of the piston, passes out through passage 57, chamber 55, port 62 to the interior of the steam chest bushing into the exhaust chamber 54 at the crank end of the steam chest, thence through the exhaust 13 to the stack in the usual manner.

At this time there is also free passage from the port 62 through passage 64, port 66, the interior of the steam chest bushing, through the aperture 47 in web 46 to the exhaust chamber 54 at the head end of the steam chest. The exhaust valve spool 45 remains in position to close the port 63, at the head end of the steam chest, so that there is no waste of steam into exhaust. As engine rotation continues, the admission valve 37 moves to the left, as in Figure 3, to close the port 67 for cut off of live steam from the boiler. Expansion of steam in the cylinder continues, the exhaust now is being gradually cut off by the spool 44 which is moving to the left to close the port 62. Movement continues, as indicated in Figure 4, and now port 67 is just about to be opened to exhaust so that before the piston reaches the end of its excursion there will be some exhaust steam movement through port 63, passage 65 and port 67. Thereafter spool 45 at the head end will open the port 63 for full steam exhaust on a return stroke of the piston and identically the same cycle will take place, on the return stroke of the piston as live steam is admitted to the crank end of the cylinder.

It will be noted that no matter what the setting of the admission link block may be, the exhaust valve will follow identically the same cycle with relation to piston movement so that the operator can change his admission and cut-off timing as he wills, but always the exhaust valve opens at the same angular relation to piston travel and stays open at the same angular relation independent of the setting of the admission and cut off.

I claim:

1. In combination, a valve chest for steam engines and the like having steam and exhaust ports, separate admission and exhaust valves mounted for reciprocation in the chest, separate actuating means for each valve, operating connections between the actuating means and the engine adapted to reciprocate the valves in consonance with engine operation, a separate reversing gear interposed between each actuating means and the operating connection and separate control means for the reversing gears, the control means for the reversing gear associated with the steam valve being adapted to change the engine cycle from forward to reverse and vice versa and to vary the position in the engine cycle of the point of admission and cut off, the control means for the reversing gear associated with the exhaust valve being adapted to change the engine from forward to reverse and vice versa only whereby the opening and closing points of the exhaust positions of the exhaust valve in the engine cycle are wholly independent of the point of admission and cut off.

2. In a valve chest for steam engines and the like, a steam chest bushing, separate concentric admission and exhaust valves mounted for reciprocation therein, and separate independent valve actuating mechanisms for each of the valves, the admission valve being centrally located in the steam chest, the exhaust valve having separate elements located one beyond each end of the admission valve, such elements being tied together for simultaneous reciprocation, both valves being longitudinally apertured to permit free movement of exhaust steam throughout the bushing from end to end, longitudinal passageways in the walls of the bushings, ported for control by the admission valve only.

3. In combination, a steam engine cylinder, a steam chest, a steam chest bushing therein open from end to end, ports in the bushing adjacent the head end and the crank end thereof, passages between the crank and head ends of the cylinder and the respective ports in the bushing, exhaust chambers in each end of the chest communicating with the bushing, a live steam passage in the chest, the bushing being centrally ported in register with this passage, longitudinal passages in each end of the bushing extending inwardly from and in communication with the head end and crank end ports respectively, terminating short of the live steam ports, there being ports in the interior wall of the bushing communicating with said passages.

4. In combination, a steam engine cylinder, a steam chest, a steam chest bushing therein open from end to end, ports in the bushing adjacent the head end and the crank end thereof, passages between the crank and head ends of the cylinder and the respective ports in the bushing, exhaust chambers in each end of the chest communicating with the bushing, a live steam passage in the chest, the bushing being centrally ported in register with this passage, longitudinal passages in each end of the bushing extending inwardly from and in communication with the head end and crank end ports respectively, terminating short of the live steam ports, there being ports in the interior wall of the bushing communicating with said passages, an admission valve mounted for reciprocation in the bushing adapted to control the ports associated with said passages, an exhaust valve mounted for reciprocation in the bushing having members adapted to control the head and crank end ports.

5. In combination, a steam engine cylinder, a steam chest, a steam chest bushing therein open from end to end, ports in the bushing adjacent the head end and the crank end thereof, passages between the crank and head ends of the cylinder and the respective ports in the bushing, exhaust chambers in each end of the chest communicating with the bushing, a live steam passage in the chest, the bushing being centrally ported in register with this passage, longitudinal passages in each end of the bushing extending inwardly from and in communication with the head end and crank end ports respectively, terminating short of the live steam ports, there being ports in the interior wall of the bushing communicating with said passages, an admission valve mounted for reciprocation in the bushing adapted to control the ports associated with said passages, an exhaust valve mounted for reciprocation in the bushing having members adapted to control the head and crank end ports, and separate means for separately actuating said valves.

6. In a steam engine having a piston, separately movable intake and exhaust valves, steam passages controlled by them, means responsive to piston movement for actuating one of the valves to control the flow of steam during exhaust movement of the piston and separate means for actuating another of the valves to control the flow of steam during the admission movement, and during a portion of the exhaust movement of the piston.

7. In a steam engine having a piston, separately movable intake and exhaust valves, steam passages controlled by them, means responsive to piston movement for actuating one of the valves to control the flow of steam during exhaust movement of the piston and separate means for actuating another of the valves to control the flow of steam during the admission movement, and during a portion of the exhaust movement of the piston, manually controlled means for adjusting the valve actuating means for the valve which controls admission of steam whereby the admission and cut off is under the control of the operator and whereby the exhaust valve will be caused to open always at the same angular position with respect to piston travel.

8. In a steam engine having a piston, separately movable intake and exhaust valves, steam passages controlled by them, engine operated means for moving said valves to control steam flow, manually operated means for adjusting the valve moving means to vary the valve cycle of both intake and exhaust valves from forward to reverse and for varying the point of admission and cut off of the intake valve.

9. In a steam engine having a piston, separately movable intake and exhaust valves, steam passages controlled by them, engine operated means for moving said valves to control steam flow, manually operated means for adjusting the valve moving means to vary the valve cycle of both intake and exhaust valves from forward to reverse and for varying the point of admission and cut off of the intake valve, the actuating means irrespective of the manual adjustment being adapted to cause the exhaust valve to open at the same angular position and remain open during the same angular position with respect to piston travel independent of the setting of admission and cut off.

PAUL WILLIS.

REFERENCES CITED

The following references are of record in the file of this patent:

UNITED STATES PATENTS

| Number | Name | Date |
|---|---|---|
| 819,976 | Richardson | Apr. 24, 1906 |
| 1,760,952 | Marshall | June 3, 1930 |

FOREIGN PATENTS

| Number | Country | Date |
|---|---|---|
| 199,691 | Germany | July 11, 1908 |